US012799290B2

(12) United States Patent
Ikeda et al.

(10) Patent No.: US 12,799,290 B2

(45) Date of Patent: Nov. 17, 2026

(54) EPOXY RESIN COMPOSITION AND PREPREG

(71) Applicant: Toray Industries, Inc., Tokyo (JP)

(72) Inventors: Yuki Ikeda, Nagoya (JP); Ginpei Machida, Iyo-gun (JP); Ichiro Taketa, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 478 days.

(21) Appl. No.: 18/695,966

(22) PCT Filed: Sep. 7, 2022

(86) PCT No.: PCT/JP2022/033520

§ 371 (c)(1),
(2) Date: Mar. 27, 2024

(87) PCT Pub. No.: WO2023/053869

PCT Pub. Date: Apr. 6, 2023

(65) Prior Publication Data

US 2024/0392087 A1 Nov. 28, 2024

(30) Foreign Application Priority Data

Sep. 30, 2021 (JP) ................................ 2021-160396

(51) Int. Cl.

| | |
|---|---|
| ***C08L 63/00*** | (2006.01) |
| ***C08J 5/24*** | (2006.01) |

(52) U.S. Cl.

CPC ............... *C08J 5/249* (2021.05); *C08J 5/244* (2021.05); *C08L 63/00* (2013.01); *C08J 2363/02* (2013.01); *C08J 2429/14* (2013.01)

(58) Field of Classification Search

CPC combination set(s) only.
See application file for complete search history.

(56) References Cited

FOREIGN PATENT DOCUMENTS

| | | | | |
|---|---|---|---|---|
| EP | 3173434 A1 * | 5/2017 | .......... | H10W 74/476 |
| JP | 2003026763 A | 1/2003 | | |
| JP | 2014145018 A | 8/2014 | | |
| JP | 2021120215 A | 8/2021 | | |
| JP | 2021147550 A | 9/2021 | | |
| WO | 2016013622 A1 | 1/2016 | | |
| WO | 2021/133972 A1 | 7/2021 | | |

OTHER PUBLICATIONS

International Search Report (PCT/ISA/210) with English translation and Written Opinion (PCT/ISA/237) mailed on Nov. 29, 2022, by the Japanese Patent Office as the International Searching Authority for International Application No. PCT/JP2022/033520.

The partial supplementary European Search Report (Communication pursuant to Rule 164(1) EPC) issued Nov. 25, 2024, by the European Patent Office in corresponding European Patent Application No. 22875741.5-1102. (12 pages).

* cited by examiner

*Primary Examiner* — Peter A Salamon

(74) *Attorney, Agent, or Firm* — Buchanan Ingersoll & Rooney PC

(57) ABSTRACT

A resin composition is described with excellent light resistance, and a prepreg with excellent light resistance and good handling ability at room temperature and exhibiting less resin flow during cure molding, where the resin composition is an epoxy resin composition comprising the following constituents [A], [B], [C], and [D], wherein 95 mass % or more of the total mass of the constituent [B] is a non-aromatic epoxy resin represented by formula (I) where n is 1:

[A]: a non-aromatic epoxy resin other than the constituent [B];

[B]: a non-aromatic epoxy resin represented by formula (I):

[Chem. 1]

(I)

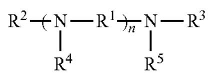

where $R^1$, $R^2$, $R^3$, $R^4$, and $R^5$ are as defined;

[C] a curing agent; and

[D] a non-aromatic thermoplastic resin.

13 Claims, No Drawings

EPOXY RESIN COMPOSITION AND PREPREG

CROSS REFERENCE TO RELATED APPLICATIONS

This application is the U.S. National Phase of PCT/JP2022/033520, filed Sep. 7, 2022, which claims priority to Japanese Patent Application No. 2021-160396, filed Sep. 30, 2021, the disclosures of these applications being incorporated herein by reference in their entireties for all purposes.

FIELD OF THE INVENTION

The present invention relates to an epoxy resin composition with excellent light resistance, and a prepreg with good handling ability using the epoxy resin composition with excellent light resistance.

BACKGROUND OF THE INVENTION

Prepregs produced by impregnating fibrous materials with thermosetting resins such as epoxy resins are often used for products requiring high structural performance, such as aircraft structural members, wind turbine blades, automobile exterior panels, and computer applications such as IC trays and laptop computer chassis. However, fiber reinforced composites obtained by curing common prepregs have low light resistance and deteriorate and degenerate when their surfaces are exposed to light. Therefore, in recent years, there has been an increasing demand for imparting light resistance to the surfaces of fiber reinforced composites. Patent Literature 1 proposes an epoxy resin containing no aromatic ring as a resin composition having light resistance.

PATENT LITERATURE

Patent Literature 1: JP 2003-26763 A

SUMMARY OF THE INVENTION

However, the non-aromatic epoxy resin described in Patent Literature 1 generally has low viscosity due to weak intermolecular interactions. Therefore, resin films including the non-aromatic epoxy resin and prepregs including fibrous materials impregnated with the resin film have problems of poor handling ability at room temperature and high probability of generating resin flow during cure molding.

Therefore, it is an object of the present invention to provide a resin composition that has excellent light resistance, and also has an excellent handling ability at room temperature when used as a prepreg. It is also an object to provide a prepreg that has excellent light resistance, and has a still more excellent handling ability at room temperature and less resin flow during cure molding in a preferred aspect.

In order to solve the above-described problems, the present invention provides a resin composition having the following constitution.

An epoxy resin composition including constituents [A], [B], [C], and [D], wherein 95 mass % or more of the total mass of the constituent [B] is non-aromatic epoxy resins represented by formula (I) where n is 1:

[A]: a non-aromatic epoxy resin other than the constituent [B]

[B]: a non-aromatic epoxy resin represented by formula (I):

[Chem. 1]

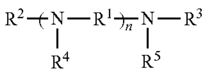

(I)

where $R^1$ represents a divalent group which is any one of a non-aromatic hydrocarbon group and a non-aromatic hydrocarbon group connected via an ether group or an amino group (—NR—; where R is a non-aromatic hydrocarbon group) (hereinafter, a "group which is a non-aromatic hydrocarbon group or a non-aromatic hydrocarbon group connected via an ether group or an amino group (—NR—; where R is a non-aromatic hydrocarbon group)" is collectively referred to as a "non-aromatic organic group"); $R^2$ and $R^3$ each represents a non-aromatic organic group in which hydrogen atoms of said non-aromatic hydrocarbon group are substituted with at least one epoxy group and at least one hydroxyl group; $R^4$ and $R^5$ each represents a non-aromatic organic group in which hydrogen atoms of said non-aromatic hydrocarbon group are substituted with at least one epoxy group and at least one hydroxyl group, a non-aromatic hydrocarbon group forming a part of a nitrogen-containing heterocycle, or a hydrogen atom, wherein in formula (I), n is an integer of 1 to 5; and $R^1$, $R^2$, $R^3$, $R^4$, and $R^5$ each represents a hydrogen atom, a linear, branched, or cyclic structure.

[C]: a curing agent

[D] a non-aromatic thermoplastic resin

Another aspect of the present invention to solve the above problem is a resin composition having the following constitution.

An epoxy resin composition including constituents [G], [C], and [D'], and having the following properties 1 and 2:

[G]: a mixture of epoxy resins including at least one non-aromatic epoxy resin and having a number average molecular weight of 550 to 800 g/mol as a mixture

[C]: a curing agent

[D']: a non-aromatic thermoplastic resin having a number average molecular weight of 16,000 to 28,000 g/mol Property 1: Bending fracture strain is determined as 4.5% or more for a cured resin plate with a thickness of 2 mm, obtained by defoaming in a vacuum, raising temperature at a temperature ramp rate of 2 °C/min, maintaining the temperature at 180 °C for 120 minutes, and curing.

Property 2: The epoxy resin composition does not include a non-aromatic epoxy resin represented by formula (I):

[Chem. 2]

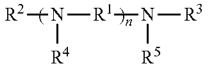

(I)

where $R^1$ represents a divalent non-aromatic organic group; $R^2$ and $R^3$ each represents a non-aromatic organic group in which hydrogen atoms of said non-aromatic hydrocarbon group are substituted with at least one epoxy group and at least one hydroxyl group; $R^4$ and $R^5$ each represents a non-aromatic organic group in which hydrogen atoms of said non-aromatic hydrocarbon group are substituted with at least one epoxy group and one hydroxyl group, a non-aromatic hydrocarbon group forming a part of a nitrogen-containing heterocycle, or a hydrogen atom, wherein in formula (I), n represents an integer of 1 to 5; and $R^1$, $R^2$, $R^3$, $R^4$ and $R^5$ each represents a hydrogen atom, or a linear, branched, or cyclic structure.

The present invention can provide an epoxy resin composition having excellent light resistance, and having an excellent handling ability at room temperature when used as a prepreg. A resin film formed from the epoxy resin composition of the present invention and a prepreg including the fibrous material impregnated with the resin film have excellent light resistance, and have an excellent handling ability at room temperature and exhibit less resin flow during cure molding in a preferred aspect.

DETAILED DESCRIPTION OF EMBODIMENTS OF THE INVENTION

Each constituent of the resin composition of the present invention will be described in detail. In the present invention, "aromatic" refers to those including aromatic hydrocarbon groups or conjugated unsaturated heterocyclic groups in their chemical structures, that is, having conjugated unsaturated ring structures that satisfy Hückel rule, and all the rest are "non-aromatic". When an essential range, a preferable range, and the like for a certain physical property, characteristics are indicated by multiple numerical ranges, a combination of the upper limit and the lower limit of any of the multiple ranges is also a preferable range (e.g., the preferred range of the number average molecular weight of the non-aromatic epoxy resin or mixture thereof described below may be from 600 to 800 g/mol).

The epoxy resin composition of the present invention is an epoxy resin composition using a non-aromatic epoxy resin as the epoxy resin, in which the non-aromatic epoxy resin preferably accounts for, preferably 90% or more, more preferably 95% or more, or may account for 100% of the total epoxy resin being 100 mass %.

"Constituent [A]"

The constituent [A] is a non-aromatic epoxy resin that does not fall within the category of constituent [B] described below, and may also be a mixture of multiple types of such epoxy resins. Examples of the epoxy resin that falls within a category of the constituent [A] include alicyclic epoxy resins (epoxy resins containing cycloalkane rings) such as tetrahydroindene diepoxide, vinylcyclohexene oxide, dipentene dioxide, dicyclopentadiene dioxide, bis(2,3-epoxycyclopentyl) ether, 1,2-epoxy-4-(2-oxiranyl)cyclohexane adduct of 2,2-bis(hydroxymethyl)-1-butanol, bi-7-oxabicyclo[4.1.0] heptane, dodecahydrobisphenol A diglycidyl ether, dodecahydrobisphenol F diglycidyl ether, 1,4-cyclohexane dimethanol diglycidyl ether, 2,2-bis(4-hydroxycyclohexyl) propane diglycidyl ether. Further, specific examples of the epoxy resin containing none of aromatic ring, aminic nitrogen atom, cycloalkane ring, and cycloalkene ring include ethylene glycol diglycidyl ether, propylene glycol diglycidyl ether, 1,4-butane diol glycidyl ether, 1,6-hexane diol diglycidyl ether, neopentylene glycol diglycidyl ether, glycerol polyglycidyl ether, diglycerol polyglycidyl ether, trimethylolpropane polyglycidyl ether, sorbitol polyglycidyl ether, 1,4-bis(2-oxiranyl) butane, and pentaerythritolpolyglycidyl ether. Specific examples of the monofunctional epoxy compound containing none of aromatic ring and aminic nitrogen atom (an epoxy compound containing only one oxirane ring) include 4-tert-butylglycidyl ether, butylglycidyl ether, 1-butene oxide, 1,2-epoxy-4-vinylcyclohexane, and 2-ethylhexylglycidyl ether.

The combination of the above-described non-aromatic epoxy resins or mixtures thereof is not particularly limited in the present invention. From the viewpoint of heat resistance, an alicyclic epoxy resin, or an epoxy resin having a cycloalkane structure such as a cyclohexane ring in its molecule is preferably used as the non-aromatic epoxy resin of the constituent [A].

Commercially available products of the above-described non-aromatic epoxy resin can be used. For example, EHPE3150 (manufactured by DAICEL CORPORATION), THI-DE (manufactured by JXTG Energy Corporation), TTA22 (manufactured by SUN CHEMICAL COMPANY LTD.), Ex-121, Ex-211, Ex-212, Ex-313, Ex-321, Ex-411 (manufactured by Nagase ChemiteX Corporation), "Epolite®" 4000 (manufactured by KYOEISHA CHEMICAL Co., Ltd.), ST-3000, ST-4000 (manufactured by NIPPON STEEL Chemical & Material Co., Ltd.), YX8000 (manufactured by Mitsubishi Chemical Corporation), EPALOY5000 (manufactured by HUNTSMAN) can be used.

"Constituent [B]"

[Chem. 3]

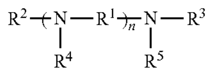

(I)

The constituent [B] is a non-aromatic epoxy resin having a structure represented by formula (I), containing at least two hydroxyl groups and at least two epoxy groups in its molecular structure, and further containing a secondary amino group or a tertiary amino group in its molecular structure. In formula (I), $R^1$ represents a divalent non-aromatic organic group; $R^2$ and $R^3$ each represents a monovalent non-aromatic organic group in which hydrogen atoms of said non-aromatic hydrocarbon group are substituted with at least one epoxy group and at least one hydroxyl group; $R^4$ and $R^5$ each represents a non-aromatic hydrocarbon group in which hydrogen atoms of said non-aromatic hydrocarbon group are substituted with at least one epoxy group and at least one hydroxyl group, a non-aromatic hydrocarbon group forming a part of a nitrogen-containing heterocycle, or a hydrogen atom. In formula (I), n is an integer from 1 to 5, preferably an integer of 1 or 2, and 95 mass % or more of the total mass of the constituent [B] is non-aromatic epoxy resins of formula (I) where n is 1. $R^1$, $R^2$, $R^3$, $R^4$ and $R^5$ each may represent a hydrogen atom, a linear, branched, or cyclic structure. The epoxy groups in $R^2$, $R^3$, $R^4$, and $R^5$ are preferably glycidyl groups or alicyclic epoxy groups. The "non-aromatic organic group" is preferably a non-aromatic hydrocarbon group. When the non-aromatic hydrocarbon groups are connected via an ether group or an amino group (—NR—; where R is a non-aromatic hydrocarbon group), the number of the connected non-aromatic hydrocarbon groups may be 3 or more. The R which substitutes the amino group may form part of the cyclic structure.

The constituent [B] can be obtained, for example, by reacting a non-aromatic epoxy compound (including a case where it is resin; the same applies hereinafter) with a non-aromatic amine. Such a non-aromatic epoxy compound has a plurality of epoxy groups, and the resins exemplified for the above-described constituent [A] may be used. Specific examples of the non-aromatic amine include ethylene diamine, diethylene triamine, triethylene tetraamine, tetraethylene pentaamine, pentaethylene hexaamine, N-aminoethylpiperadine, 4,4'-methylenebis(2-methylcyclohexylamine), isophorone diamine, 4,4'-methylenebis (cyclohexylamine), 1,3-bis(aminomethyl)cyclohexane, methoxypoly(oxyethylene/oxypropylene)-2-propyl amine, polyoxypropylenediamine, polyether amine, triethylene glycol diamine, and trimethylolpropane poly(oxypropylene) triamine, and glycerylpoly(oxypropylene)triamine, and those reacting with the non-aromatic epoxy compound to form the above-described structure are selected.

In the present invention, the combination of non-aromatic epoxy compound and non-aromatic amine used for the reaction to obtain the constituent [B] is not particularly limited so long as it provides an epoxy resin having a structure represented by formula (I). In the reaction between the non-aromatic epoxy compound and the non-aromatic amine for obtaining a structure of formula (I), the molar ratio of the non-aromatic epoxy compound to the non-aromatic amine is preferably 1.0:(0.1 to 0.5). Within the range, the constituent [B] includes at least two epoxy groups in its structure, and thus it can act as a thermosetting resin.

It also makes it possible to complete the reaction without gelation during curing. The above-described reaction is preferably a reaction by heating, and a catalyst may be used for the reaction. In the above-described reaction, the non-aromatic epoxy compound and the non-aromatic amine are preferably stirred at 80 to 180 °C for 1 to 12 hours, more preferably at 80 to 150 °C for 1 to 5 hours. The above-described reaction is preferably carried out as a preliminary reaction in a system with no curing agent present therein, and an epoxy resin composition can be obtained by adding a curing agent or the like to a reaction product including the constituent [A] and the constituent [B]. From the viewpoint of heat resistance, the non-aromatic epoxy compound and the non-aromatic amine having cycloalkane structures such as alicyclic or cyclohexane rings in their molecules are preferably used.

Commercially available products can be used as the above-described non-aromatic epoxy compound and the non-aromatic amine. A preferred aspect is to use the same resin as the non-aromatic epoxy resin used for the constituent [A] as the non-aromatic epoxy compound. Examples of the non-aromatic amine includes EDA (ethylene diamine), DETA (diethylene triamine), TETA (triethylene tetraamine), TEPA (tetraethylene pentaamine), PEHA (pentaethylene hexaamine), AEP (aminoethylpiperazine) (Tosoh Corporation), Ramirone C-260, IPDA (isophorone diamine) (manufactured by BASF Corporation), WANDAMINE HM (manufactured by New Japan Chemical Co., Ltd.), "VESTAMIN®" PACM (manufactured by Evonik Japan Co., Ltd.), 1,3-BAC (manufactured by MITSUBISHI GAS CHEMICAL COMPANY, INC.), and "JEFFAMINER" (manufactured by HUNTSMAN).

The constituent [A] and the constituent [B] preferably have a number average molecular weight in a range from 450 to 800 g/mol when made into a mixture of the constituent [A] and the constituent [B]. In the present invention, the combination and composition ratio of them are not particularly limited. From the viewpoint of ease of forming a resin film and tackiness properties of the prepreg produced by impregnating the fibrous material with the resin film, the number average molecular weight of the mixture of the constituent [A] and the constituent [B] is preferably 550 to 700 g/mol, more preferably, 600 to 700 g/mol. When the number average molecular weight is 800 g/mol or less, the viscosity of the epoxy resin composition is not too high, and it is easy to form a resin film by a hot-melt process, which is preferable. On the other hand, when the number average molecular weight is 450 g/mol or more, the viscosity of the epoxy resin composition is not too low, and the tackiness of the prepreg including the fibrous material impregnated with the resin film that is formed from the resin composition is not too excessive, which is preferable. The number average molecular weight used herein means the number average molecular weight in terms of polystyrene determined by gel permeation chromatography.

"Constituent [C]"

The epoxy resin composition of the present invention contains a curing agent (constituent [C]). The type of the curing agent is not particularly limited, and examples thereof include amine-based curing agents, imidazole type, cationic curing agents, acid anhydrides, and boron chloride amine complexes. From the viewpoint of light resistance, it is preferable to use non-aromatic curing agents. The non-aromatic curing agents refer to curing agents containing no aromatic hydrocarbon group nor unsaturated heterocyclic group in their chemical structure. Among them, dicyandiamide is preferable, because use of dicyandiamide enables complete curing at relatively low temperature while maintaining long-term stability without changing performance due to moisture in the epoxy resin composition before curing.

Commercially available products can be used as the above-described curing agent. For example, for dicyandiamide, "jERcure®" DICY7, DICY15 (manufactured by Mitsubishi Chemical Corporation); for imidazole type, Curezol 1.2 DMZ, C11Z, C17Z (manufactured by SHIKOKU KASEI HOLDINGS CORPORATION); for cationic curing initiators, "ADEKAOPTON®" CP-77, "ADEKAOPTON®" CP-66 (manufactured by ADEKA CORPORATION), CI-2639, CI-2624 (Nippon Soda Co., Ltd.), "SAN-AID®" SI-60, "SAN-AID®" SI-80, "SAN-AID®" SI-100, "SAN-AID®" SI-150, "SAN-AID®" SI—B4, "SAN-AID®" SI—B5 (manufactured by SANSHIN CHEMICAL INSDUSTORY CO., LTD.), TA-100, IK-1PC (80) (San-Apro Ltd.); for acid anhydrides, RIKACID (manufactured by New Japan Chemical Co., Ltd.); for boron trifluoride piperidine, boron chloride amine complex, boron trifluoride monoethyl amine (manufactured by Stella Chemifa Corporation) can be used.

The preferred blending amount of dicyandiamide is such that the mole number of the active hydrogen of dicyandiamide is 0.6 to 1.2 times the mole number of the epoxy group derived from all the epoxy resins blended in the epoxy resin composition, which is preferable in that a cured product exhibiting good mechanical properties can be obtained. Moreover, 0.7 to 1.0 times is more preferable because of excellent heat resistance.

"Constituent [D]"

The epoxy resin composition of the present invention contains a non-aromatic thermoplastic resin (constituent [D]). The non-aromatic thermoplastic resin refers to a non-aromatic thermoplastic resin. The "non-aromatic" is as explained above. As the non-aromatic thermoplastic resin, for example, polyvinyl alcohol and its acetal compound can be used. Examples of the non-aromatic thermoplastic resin include polyvinyl alcohol, acetal compounds of polyvinyl alcohol such as polyvinyl acetal, polyvinyl formal, polyvinyl acetoacetal, polyvinyl butyral, and others such as polyvinyl acetate, hydrogenated bisphenol A pentaerythritol phosphite polymer, hydrogenated terpene, hydrogenated terpene phenol.

Among those described above, polyvinyl alcohols and their acetal compounds, polyvinyl acetals (polyvinyl acetoacetal, polyvinyl butyral, polyvinyl formal) or polyvinyl vinyl acetate, which have high solubility in non-aromatic epoxy resin are preferable in that it allows easy adjustment of viscosity of the epoxy resin composition.

From the viewpoint of ease of forming a film and tackiness properties of the prepreg produced by impregnating the fibrous material with the resin film, the number average molecular weight of these non-aromatic thermoplastic resins is preferably from 16,000 to 28,000 g/mol, more preferably 17,000 to 27,000 g/mol, still more preferably 18,000 to 27,000 g/mol. When the number average molecular weight of the non-aromatic thermoplastic resin is more than 28,000 g/mol, the increase in viscosity of the epoxy resin composition per addition amount of the non-aromatic thermoplastic resin may increase. Therefore, from the viewpoint of ease of forming a resin film and tackiness adjustment, it is required to reduce the addition amount. However, the lower the addition amount of the thermoplastic resin, the lower the bending fracture strain of the cured resin may be observed. On the other hand, when the number average molecular weight of the non-aromatic thermoplastic resin is less than 16,000 g/mol, the increase in viscosity of the epoxy resin composition per addition amount of the non-aromatic thermoplastic resin may be reduced. Therefore, tackiness of the film may become excessive, and reduction in elastic modulus of the cured resin may be observed. When the number average molecular weight of the non-aromatic thermoplastic resin is from 16,000 to 28,000 g/mol, appropriate balance between ease of forming a resin and appropriate tackiness of the resin composition, fracture strain and elastic modulus of the cured resin is provided. The number average molecular weight used herein means the number average molecular weight in terms of polystyrene determined by gel permeation chromatography.

Commercially available products can be used as the above-described non-aromatic thermoplastic resins. Examples include "J-POVAL®" (manufactured by JAPAN VAM & POVAL CO., LTD.), "S-Lec®" (manufactured by SEKISUI CHEMICAL CO., LTD.), "Ultrasen®" (manufactured by Tosoh Corporation), "JPH-3800" (manufactured by Johoku Chemical Co., Ltd.), "YS Polystar UH130" (manufactured by Yasuhara Chemical Co., LTD.).

From the viewpoint of ease of forming a film and tackiness properties of the prepreg produced by impregnating the fibrous material with the resin film, the content of the above-described non-aromatic thermoplastic resin is preferably 1 to 20 parts by mass, more preferably 5 to 15 parts by mass, with respect to 100 parts by mass of the total of the constituent [A] and the constituent [B].

"Constituent [E]"

The epoxy resin composition in the present invention may contain a curing accelerator (constituent [E]). Examples of the curing accelerator include urea-based curing accelerators, hydrazide-based curing accelerators, tertiary amines, imidazole type, phenols. Particularly, when the constituent [C] is dicyandiamide, urea-based curing accelerators are preferred from the viewpoint of curing acceleration and storage stability at room temperature.

Commercially available products can be used as the above-described curing accelerator. Examples include DCMU99 (manufactured by Hodogaya Chemical Co., Ltd.), "Omicure®" U-24M, U-52M (manufactured by CVC Thermoset Specialties, Inc.), UDH-J (manufactured by Ajinomoto Fine-Techno Co., Inc.), CDH, MDH, SUDH, ADH, SDH (manufactured by JAPAN FINECHEM COMPANY, INC.), "DDH-S, IDH-S" (manufactured by Otsuka Chemical Co., Ltd.), "KAOLIZER®" No. 20 (manufactured by Kao Corporation).

From the viewpoint of curing acceleration and storage stability at room temperature, the blending amount of the curing accelerator is preferably 0.1 to 5 parts by mass, more preferably 1 to 3 parts by mass, with respect to 100 parts by mass of the total of the constituent [A] and the constituent [B].

"Constituent [F]"

The epoxy resin composition in the present invention may contain inorganic particles (constituent [F]). Examples of the inorganic particles include inorganic particles developing thixotropic properties when blended (referred to herein as a "thixotropic agent") and pigments.

Examples of thixotropic agents include silicon dioxide, synthetic hectorite, viscosity minerals, modified bentonites, and mixed systems of minerals and organically modified bentonites.

Commercially available products can be used as the above-described thixotropic agent, and examples include fumed silica ("AEROSIL®" 50, 90G, 130, 150, 200, 300, 380, RY200S, "AEROXIDE®" AluC, Alu65, Alu130, TiO2T805 (manufactured by NIPPON AEROSIL CO., LTD.)), "OPTIGEL®" WX, "OPTIBENT®" 616, "GARAMITE®" 1958, 7305, "LAPONITE®" S-482, "TIXOGEL®" MP, VP, "CRAYTONE®" 40, "CLOISITE®" 20A (manufactured by BYK Japan KK), "Somasifu®" ME-100, and Micromica MK (manufactured by Katakura & Co-op Agri Corporation).

From the viewpoint of ease of forming a film and suppression of resin flow during cure molding, the blending amount of the thixotropic agent is preferably 1 to 10 parts by mass, more preferably 3 to 8 parts by mass, with respect to 100 parts by mass of the total of the constituents [A] and [B].

Examples of the pigment include barium sulfate, zinc sulfide, titanium oxide, aluminum oxide, molybdenum red, cadmium red, chromium oxide, titanium yellow, cobalt green, cobalt blue, ultramarine blue, barium titanate, carbon black, iron oxide, red phosphorus, and copper chromate.

Commercially available products can be used as the above-described pigment, and examples include B-30, BARIFINE BF (manufactured by SAKAI CHEMICAL INDUSTRY CO., LTD.), "Ti-Pure®" TS-6200, R-902+, R-960, R-706 (manufactured by Chemours), "AEROXIDE®" (manufactured by NIPPON AEROSIL CO., LTD.).

From the viewpoint of ease of forming a film and light resistance, the blending amount of the pigment is preferably 15 to 50 parts by mass, more preferably 20 to 40 parts by mass, with respect to 100 parts by mass of the total of the constituents [A] and [B].

"Constituent [G]"

The constituent [G] is a mixture of epoxy resins including at least one non-aromatic epoxy resin and having a number average molecular weight of 550 to 800 g/mol as a mixture.

The combination of epoxy resins is not particularly limited as long as the constituent [G] has a number average molecular weight in the range of 550 to 800 g/mol and contains at least one non-aromatic epoxy resin.

That is, using the non-aromatic thermoplastic resin (constituent [D']) having the number average molecular weight of 16,000 to 28,000 g/mol in combination and producing a composition further having the following properties 1 and 2 realize an excellent handling ability at room temperature and suppression of resin flow during cure molding. From the viewpoint of ease of forming a film and tackiness properties of the prepreg produced by impregnating the fibrous material with the resin film, the constituent [G] preferably has the number average molecular weight of 550 to 700 g/mol, more preferably 600 to 700 g/mol. When the above-described number average molecular weight is more than 800 g/mol, high viscosity of the epoxy resin composition makes it difficult to form a resin film by the hot-melt process, and reduces tackiness of the prepreg including the fibrous material impregnated with the resin film that is formed from the resin composition. On the other hand, when the number average molecular weight of the constituent [G] is less than 550 g/mol, the viscosity of the epoxy resin composition is low, and the tackiness of the prepreg including the fibrous material impregnated with the resin film that is formed from the resin composition becomes excessive. When the number average molecular weight of the constituent [G] is in a range from 550 to 800 g/mol, a good balance between ease of forming a resin film and tackiness are provided. The number average molecular weight used herein means the number average molecular weight in terms of polystyrene determined by gel permeation chromatography. From the viewpoint of heat resistance, non-aromatic epoxy resins such as alicyclic epoxy or those having a cycloalkane structure such as a cyclohexane ring in a molecule thereof are preferably used.

In the constituent [G], commercially available products can be used as the non-aromatic epoxy resin. Examples include "CELLOXIDE®" 2021P, "CELLOXIDE®" 8010, "CELLOXIDE®" 2000, "Epolide®" GT401, "CELLOXIDE®" 2081, EHPE3150 (manufactured by DAICEL CORPORATION), THI-DE (manufactured by JXTG NIPPON OIL & ENERGY CORPORATION), TTA21, AAT15, TTA22 (manufactured by SUN CHEMICAL COMPANY LTD.), Ex-121, Ex-211, Ex-212, Ex-313, Ex-321, Ex-411 (manufactured by Nagase ChemiteX Corporation), "Epolite®" 4000 (manufactured by KYOEISHA CHEMICAL Co., Ltd.), ST-3000, ST-4000 (manufactured by NIPPON STEEL Chemical & Material Co., Ltd.), YX8000 (manufactured by Mitsubishi Chemical Corporation), and EPALOY5000 (manufactured by HUNTSMAN).

The constituent [G] preferably includes 90 to 100 parts by mass of the non-aromatic epoxy resin with respect to 100 parts by mass of the total mass of the epoxy resin. Thus, high light resistance can be obtained. When only an epoxy resin having an alicyclic epoxy structure or a cycloalkane structure such as a cyclohexane ring in its molecule is used as the epoxy resin, a cured epoxy resin having high light resistance and high glass transition temperature can be obtained.

When the constituent [G] is used, the epoxy resin composition of the present invention includes the above-described constituent [C] and the constituent [D'], and also has property 1 and property 2 described below. The epoxy resins satisfying the following properties realize an excellent handling ability at room temperature and suppression of resin flow during cure molding.

Property 1: Bending fracture strain is determined as 4.5% or more for a cured resin plate with a thickness of 2 mm, obtained by defoaming in a vacuum, raising temperature at a temperature ramp rate of 2 °C/min, maintaining the temperature at 180 °C for 120 minutes, and curing.

Property 2: The epoxy resin composition does not include a non-aromatic epoxy resin represented by formula (I):

[Chem. 4]

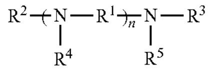

(I)

where $R^1$ represents a divalent non-aromatic organic group; $R^2$ and $R^3$ each represents a non-aromatic organic group in which hydrogen atoms of said non-aromatic hydrocarbon group are substituted with at least one epoxy group and at least one hydroxyl group; $R^4$ and $R^5$ each represents a non-aromatic organic group in which hydrogen atoms of said non-aromatic hydrocarbon group are substituted with at least one epoxy group and at least one hydroxyl group, a non-aromatic hydrocarbon group forming a part of a nitrogen-containing heterocycle, or a hydrogen atom, wherein in formula (I), n represents an integer of 1 to 5, preferably an integer of 1 or 2; and $R^1$, $R^2$, $R^3$, $R^4$ and $R^5$ each represents a hydrogen atom, or a linear, branched, or cyclic structure.

"Other Additives"

The epoxy resin composition of the present invention may include additives such as a rubber, a flame retardant, a light stabilizer, an antioxidant, and a defoaming agent, as needed.

Examples of the rubber include natural rubber, diene-based rubber, and non-diene-based rubber. Examples of diene-based rubbers include styrene-butadiene rubber, isoprene rubber, butadiene rubber, chloroprene rubber, and acrylonitrile-butadiene rubber. Examples of the non-diene-based rubber include butyl rubber, ethylene-propylene rubber, ethylene-propylene-diene rubber, urethane rubber, silicone rubber, and fluoro-rubber. As the ingredients contained in the epoxy resin composition in the present invention, the non-diene-based rubbers are preferred. Among them, ethylene-propylene rubber, ethylene-propylene-diene rubber, silicone rubber, and fluoro-rubber, which have no double bond in the polymer principal chain, are particularly preferred because they have high light resistance and little effect on light resistance of the epoxy resin composition in the present invention. As for the shape of the rubber, particularly powdered form is preferred because of excellent dispersibility in the epoxy resin composition.

The blending amount of these additives is preferably an amount within the range that does not impair the intrinsic properties of the epoxy resin composition of the present invention, that is, preferably 50 parts by mass or less with respect to 100 parts by mass of the total of the constituents [A] and [B], or 50 parts by mass or less with respect to 100 parts by mass of the constituent [G].

"Prepreg"

The epoxy resin composition in the present invention can be impregnated into the fibrous material, and used as a prepreg.

Examples of the fibrous material include carbon fiber, graphite fiber, aramid fiber, silicon carbide fiber, alumina fiber, boron fiber, high-strength polyethylene fiber, tungsten carbide fiber, PBO fiber, and glass fiber, which may be used alone or in a combination of two or more of them. The fibers may be continuous fibers and unidirectionally aligned, or fabric base materials such as woven fabric or knitted fabric. A mat made of accumulated discontinuous fibers, or a nonwoven fabric may also be acceptable. The fiber areal weight of the prepreg of the present invention is not particularly limited.

"Curing Property"

From the viewpoint of storage stability, the resin composition of the present invention and the prepreg including the epoxy resin composition preferably have a curing exothermic reaction peak temperature of 100 to 250 °C measured in a differential scanning calorimetry (DSC). From the viewpoint of surface smoothness obtained by low-temperature curing of the prepreg, 100 to 150 °C is more preferred.

"Viscosity"

From the viewpoint of ease of forming a film, tackiness properties of the prepreg produced by impregnating the fibrous material with the resin film, and resin flow during cure molding, viscosity of the epoxy resin composition of the present invention is preferably 40,000 Pa·s or more and 200,000 Pa·s or less at 30 °C, 300 Pa·s or less at 80 °C, and 100 Pas or more and 300 Pa·s or less at 100 °C. When the viscosity of the epoxy resin composition is 40,000 Pa·s or more at 30 °C, the tackiness of the prepreg including the fibrous material impregnated with the resin film that is formed from the resin composition is not too excessive, which is preferable. When the viscosity is 200,000 Pa·s or less, the prepreg including the fibrous material impregnated with the resin film that is formed from the resin composition will stick well, which is preferable. When the viscosity of the epoxy resin composition is 300 Pa·s or less at 80 °C, it becomes easy to form a resin film by the hot-melt process, and when the viscosity is 100 Pa's or more at 100 °C, resin flow of the resin film formed from the resin composition and the prepreg including the fibrous material impregnated with the resin film can be appropriately suppressed, which is preferable. When the viscosity of the epoxy resin composition is 40,000 Pa·s or more and 200,000 Pa·s or less at 30 °C, 300 Pa·s or less at 80 °C, and 100 Pa·s or more and 300 Pa·s or less at 100 °C, good balance among ease of forming a resin film, tackiness, and resin flow can be provided. The viscosity used herein means a viscosity measured at a frequency of 0.5 Hz while increasing temperature from 20 °C to 150 °C at 2 °C/min.

"Light Resistance"

From the viewpoint of light resistance, it is preferable that no discoloration is observed in the cured product of the epoxy resin composition of the present invention after irradiated with UV radiation with a wavelength of 300 to 400 nm at 1,000 KJ/$m^2$, known as an estimated amount of UV radiation for a month in Japan (summer). The phrase "no discoloration is observed" means that, in present invention, formula difference $\Delta E^*_{ab}$ before and after UV irradiation is 4 or less, where the formula difference $\Delta E^*_{ab}$ can be determined by measuring colorimetric values of the cured product of the epoxy resin composition before and after UV irradiation with a wavelength of 300 to 400 nm at 1,000 KJ/$m^2$ by the multiple light source spectrophotometer.

"Bending Fracture Strain"

The epoxy resin composition of the present invention preferably has a bending fracture strain of 4.5% or more according to the measurement test described below. The upper limit of the bending fracture strain is not particularly limited, and 7% is more than enough.

The bending fracture strain is a numerical value measured by performing a three-point bending at a span size of 32 mm according to JIS-K7171 (1994) on a cured resin plate with a thickness of 2 mm, obtained by defoaming the epoxy resin composition in a vacuum, then raising temperature ramp rate at 2 °C/min, maintaining the temperature at 180 °C for 120 minutes, and curing. The average value of 6 measurements is obtained. In a case where the resin plate is not broken in the resin bending test, the apparatus is stopped when the bending deflection exceeds 12 mm, and the value at that time is considered as the fracture strain. Detailed measurement operations are as described in the Examples section.

EXAMPLES

The present invention will be hereinafter explained in more detail in Examples. However, the scope of the present invention is not limited to these examples. Measurements of various properties were performed in an environment at a temperature of 23 °C and relative humidity of 50% unless otherwise noted.

Materials Used in Examples and Comparative Examples (1) Aromatic Epoxy Resin Bisphenol A type epoxy resin ("jER®" 828 (hereinafter "jER828"), manufactured by Mitsubishi Chemical Corporation) epoxy equivalent weight: 175 (g/eq.) (liquid)

(2) Non-Aromatic Epoxy Resin

Hydrogenated bisphenol type epoxy resin (manufactured by EPALLOY5000, HUNTSMAN) epoxy equivalent weight: 220 (g/eq.) (liquid)

1,2-Epoxy-4-(2-oxiranyl)cyclohexane adduct of 2,2-bis (hydroxymethyl)-1-butanol (EHPE3150, manufactured by DAICEL CORPORATION) epoxy equivalent weight: 170-190 (g/eq.) (solid)

(3) Non-Aromatic Amine 4,4'-Methylenebis(cyclohexylamine) (isomer mixture) ("VESTAMIN®" PACM (hereinafter "PACM"), manufactured by Evonik Japan Co., Ltd.)

(4) Curing Agent

Dicyandiamide ("jERcure®" DICY7T (hereinafter "DICY7T", manufactured by Mitsubishi Chemical Corporation)

(5) Non-Aromatic Thermoplastic Resin

Polyvinyl acetoacetal ("S-Lec®" KS-10 (hereinafter "KS-10"), KS-1 (hereinafter "KS-1"), manufactured by SEKISUI CHEMICAL CO., LTD., number average molecular weight 17,000 g/mol, 27,000 g/mol)

Polyvinyl butyral ("S-Lec®" BX-L (hereinafter "BX-L"), manufactured by SEKISUI CHEMICAL CO., LTD., number average molecular weight 18,000 g/mol)

Polyvinyl butyral ("S-Lec®" BL-10 (hereinafter "BL-10"), BL-5Z (hereinafter "BL-5Z"), BM-5 (hereinafter "BM-5"), manufactured by SEKISUI CHEMICAL CO., LTD., number average molecular weight 15,000 g/mol, 32,000 g/mol, 56,000 g/mol)

(6) Curing Accelerator

Toluene bis(dimethyl urea) ("Omicure®" 24 (hereinafter "Omicure 24"), manufactured by CVC Thermoset Specialties)

(7) Inorganic Particle

Fumed silica ("AEROSIL®" RY200S (hereinafter "RY200S"), manufactured by NIPPON AEROSIL CO., LTD.)

Titanium oxide ("Ti-Pure®" R-960 (hereinafter "R-960"), manufactured by Chemours, average particle size 0.5 μm)

(8) Fibrous Material

Polyester fiber nonwoven fabric (JH-30015, manufactured by Japan Vilene Company, Ltd., 15 g/$m^2$).

Example 1

An epoxy resin composition was prepared according to the following procedures, and used to measure viscosity, resin flexural modulus, and resin bending fracture strain to evaluate tackiness and the like of the prepreg.

<Preparation of Masterbatch of Inorganic Particles (Step 1)>

EPALLOY5000, RY200S, and R960 were weighed to be 30 parts by mass, 6.1 parts by mass, and 30 parts by mass, respectively, charged into a three-roll mill, and thoroughly mixed to obtain a homogeneous masterbatch (masterbatch 1).

<Preparation of Masterbatch of Curing Agent (Step 2)>

EPALLOY5000, DICY7T, and Omicure 24 were weighed to be 3.6 parts by mass, 3.6 parts by mass, and 2 parts by mass, respectively, charged into a three-roll mill, and thoroughly mixed to obtain a homogeneous masterbatch (masterbatch 2).

<Preparation of Mixture of Constituent [A] and Constituent [B] (Step 3)>

59.7 parts by mass of EPALLOY5000 and 6.7 parts by mass of PACM were added to the masterbatch 1 obtained above, and heated and mixed at 100 to 150 °C to perform a preliminary reaction to obtain a mixture (mixture 1) of the constituent [A] and the constituent [B].

<Preparation of Epoxy Resin Composition (Step 4)>

Fifteen parts by mass of BX-L was added to 132.5 parts by mass of the mixture 1 obtained above, and heated and mixed at 100 to 150 °C to obtain a homogeneous masterbatch (masterbatch 3).

The masterbatch 3 was cooled to 80 °C or less, then the masterbatch 2 obtained above was added at 80 °C or less, and mixed until homogeneous to obtain an epoxy resin composition.

The column "Composition before heating" in Table 1 indicates the amounts of the epoxy resin and amine components used as raw materials, and the column "Composition after heating" in Table 1 indicates the amounts of the epoxy resin and amine components and the amount of the preliminary reaction product thereof in the final composition. In the column "Composition after heating", "epoxy/amine preliminary reaction product" indicates a reaction product that does not correspond to formula (I). The column "Composition" in Table 2 indicates the composition ratio of the components in the final resin composition, and the active hydrogen equivalent weight/epoxy equivalent weight of the resin composition. To give further details for the avoidance of doubt, in the examples explained below, Step 3 may sometimes fail to produce a mixture of the constituents [A] and [B].

Examples 2 to 12, Comparative Example 3

The resin compositions were obtained in the same manner as in Example 1, except that the amounts of EPALLOY5000 and PACM added in Step 3 were changed, and the type and amount of the non-aromatic thermoplastic resin added in Step 4 were changed, as shown in Tables 1 and 2. In Example 9, however, a change was made in that 15 parts by mass of EPALLOY5000 was used in Step 1, 5.8 parts by mass of EPALLOY5000 was used in Step 2, and 2.2 parts by mass of EPALLOY5000 was used in Step 3 to obtain a resin composition.

Comparative Example 4

The resin compositions were obtained in the same manner as in Example 1, except that the amounts of EPALLOY5000 and PACM added in Step 3 were changed, and EHPE3150 was added in Step 4, as shown in Tables 1 and 2.

Comparative Example 5

The resin composition was obtained in the same manner as in Example 1, except that jER828 was used instead of EPALLOY5000 in the amounts shown in Tables 1 and 2.

Comparative Example 1

The resin compositions were obtained in the same manner as in Example 1, except that Step 3 was not performed, EPALLOY5000, which was to be added in Step 3, was added in Step 1 and the composition ratio of the final composition was as shown in Table 2.

Examples 14, 15, Comparative Example 2, Comparative Examples 6 to 14

The resin compositions were obtained in the same manner as in Comparative Example 1, except that the amount of EPALLOY (in Comparative Example 14, jER828 was used instead of EPALLOY5000) added in Step 1 was changed, EHPE3150 was further added in Step 4, and the type and amount of the non-aromatic thermoplastic resin were changed in Step 4, as shown in Table 2.

<Method of Measuring Exothermic Reaction Peak Temperature of Epoxy Resin Composition>

A differential scanning calorimeter (DSC Q2500: manufactured by TA Instruments) was used to obtain an exothermic curve of the epoxy resin composition obtained in <Preparation of epoxy resin composition> described above in a nitrogen atmosphere at a temperature ramp rate of 5 °C/min. In the resulting exothermic curve, the temperature at the exothermic reaction peak maximum where the heat value was 100 mW/g or more was calculated as an exothermic reaction peak temperature of DSC in the present invention. When there were two or more exothermic reaction peaks where the heat value was 100 mW/g or more, the temperature at the peak maximum on the lower temperature side was calculated as the above-described exothermic reaction peak temperature (Table 2, Table 3).

<Viscosity Measurement while Raising Temperature>

For the epoxy resin composition obtained in <Preparation of epoxy resin composition> described above, a dynamic viscoelasticity device, ARES-2KFRTN1-FCO-STD (manufactured by TA Instruments), was used, where flat parallel plates with a diameter of 25 mm was used as the upper and lower measurement jigs, the epoxy resin composition was set so that the distance between the upper and lower jigs was 1 mm, and then the viscosity was measured in torsion mode (measuring frequency: 0.5 Hz) while temperature was raised from 20 °C to 150 °C at 2 °C/min (Table 2, Table 3).

In Table 2, the viscosity of the resin composition composed of the mixture of the constituents [A] and [B] having the number average molecular weight in a range of 450 to 800 g/mol was 40,000 Pa·s or more and 200,000 Pa·s or less at 30 °C, 300 Pa·s or less at 80 °C, 100 Pa·s or more and 300 Pas or less at 100 °C. (Examples 1 to 7, 10, and 11), except Example 12 using a compound having low number average molecular weight as the constituent [D].

On the other hand, the viscosity of the resin composition in which the mixture of the constituents [A] and [B] had the number average molecular weight of less than 450 g/mol or more than 800 g/mol did not satisfy the above-described viscosity range at 30 °C, 80 °C, or 100 °C. (Examples 8 and 9, and Comparative Example 1).

Moreover, in Examples 13 and 14, the viscosity of the resin composition composed of the constituent [G] having the number average molecular weight in a range of 550 to 800 g/mol and the constituent [D] (constituent [D']) having the number average molecular weight in a range of 16,000 to 28,000 g/mol was 40,000 Pa·s or more and 200,000 Pa·s or less at 30 °C, 300 Pa·s or less at 80 °C, and 100 Pa·s or more and 300 Pa·s or less at 100 °C.

On the other hand, the viscosity of the resin composition in which the constituent [G] had the number average molecular weight of less than 550 g/mol or more than 800 g/mol did not satisfy the above-described viscosity range at 30 °C, 80 °C, or 100 °C. (Comparative Examples 6 to 10). The viscosity of the resin composition of Comparative Example 10 in which the number average molecular weight of the constituent [D] (constituent [D']) was less than 16,000 g/mol was less than 40000 Pa·s at 30 °C.

Further, the bending fracture strain of the cured resin of the resin composition in which the number average molecular weight of the constituent [D] (constituent [D']) is more than 28,000 g/mol (Comparative Examples 11 to 13) was lower compared with that of Example 13.

<Evaluation of Resin Flow of Epoxy Resin Composition>

Three grams of the epoxy resin composition obtained in <Preparation of epoxy resin composition> described above was weighed on a mold releasing film cut into 15 cm square (mass: W4 (g)). The epoxy resin composition was covered with another 15 cm square piece cut out from the mold releasing film, then further sandwiched between two 10 cm square metal plates (400 g each), and the temperature was raised at a temperature ramp rate of 2 °C/min and maintained at 180 °C for 120 minutes to obtain a cured product. After curing, protrusion from the 10 cm square metal plate was removed, and the mass of the remaining cured product was measured (mass: W5 (g)). The amount of resin flow [%] of the epoxy resin composition in the present invention was calculated according to the following calculation formula.

$$\text{Amount of resin flow} = (W4 - W5)/W4 \times 100\ [\%].$$

Those having an amount of resin flow of 5% or less is designated as A, those having an amount of resin flow of more than 5% and 10% or less is designated as B, and those having an amount of resin flow of more than 10% is designated as C (Table 2). Resin compositions having viscosity of less than 100 Pa·s at 100 °C had resin flow evaluations other than A (Examples 8 and 12, and Comparative Examples 1 and 10).

<Production of Resin Film>

The epoxy resin compositions of Examples 1 to 14, and Comparative Examples 1, 2, 5, 7, 8, and 10 to 14, obtained in <Preparation of epoxy resin composition> described above were heated to 60 to 100 °C, and coated onto a release paper with a film coater so that the areal weight was 80 to 120 g/m$^2$ to produce a resin film. The resin compositions of Comparative Examples 6 and 9 having viscosity of more than 300 Pa·s at 80 °C, were so hard that they could not be coated onto the release paper in the range of 80 to 120 g/m$^2$ (Table 3).

<Production of Prepreg>

A glass nonwoven fabric was impregnated with the resin films (surface of the release paper on which the resin film was formed) of Examples 1 through 14 and Comparative Examples 1, 2, 5, 7, 8, 10 through 14 obtained in <Production of Resin Films> described above under pressure sufficient for impregnation.

<Evaluation of Tackiness Properties>

The prepreg obtained in <Production of prepreg> described above was cut out in a 10 cm square piece, and placed on a 15 cm square piece of the FEP film ("Toyofuron®" 50FV, manufactured by Toray Advanced Film Co., Ltd) so that the 10 cm square prepreg on the upper side was stacked on the FEP film on the lower side. A 10 cm square stainless steel plate (400 g) having a double-sided adhesive tape attached thereon was placed on the top of the stacked prepreg, and held for 30 seconds. After that, the stainless steel plate was lifted, so that the prepreg was peeled off from the FEP film and divided into two pieces. In a case where the epoxy resin composition used for the prepreg remained on the FEP film, the tackiness properties were determined to be "poor", and in a case where no epoxy resin composition remained, the tackiness properties were determined to be "good" (Table 2 and Table 3).

In both Examples and Comparative Examples, the prepregs using resin compositions having viscosity of 40,000 Pas or more at 30 °C had good tackiness properties. On the other hand, the tackiness properties of the prepreg of Comparative Examples 7 and 10, in which the number average molecular weight of the constituent [G] was less than 550 g/mol was poor.

<Evaluation of Sticking Property>

The prepreg obtained in <Production of prepreg> described above was cut into a 10 cm square piece, attached to an aluminum plate of an arbitrary size (larger than 10 cm square), and a 10 cm square stainless steel plate (400 g) which had been subjected to mold releasing treatment by spraying DAIFREE GA-3000 (manufactured by Daikin Industries, Ltd.) was placed thereon, and held for 30 seconds. After that, the stainless steel plate was lifted and the aluminum plate was propped at 90° with respect to the axis of the ground with the prepreg attached to the aluminum plate. In a case where the prepreg was still attached to the aluminum plate after 24 hours, the sticking property was determined to be "good" and in a case where any part was peeling off, the sticking property was determined to be "poor" (Table 2 and Table 3). The prepreg produced using the resin composition of Comparative Example 8 having the number average molecular weight of more than 800 g/mol and viscosity of more than 200,000 Pa·s at 30 °C had poor sticking property.

<Production of Cured Resin Plate>

The epoxy resin composition obtained in <Preparation of epoxy resin composition> described above was defoamed in a vacuum, sandwiched between stainless steel plates together with a 2 mm thick spacer made of polytetrafluoroethylene, and the temperature was raised at a temperature ramp rate of 2 °C/min, and maintained at 180 °C for 120 minutes for curing to obtain a cured resin plate.

<Bending Test of Cured Resin Product>

The cured product of the epoxy resin having a thickness of 2 mm obtained in <Production of cured resin plate> described above was cut into a piece of 10±0.1 mm-wide and 60±1 mm-long to obtain a test piece. A three-point bending at a span size of 32 mm was performed according to JIS-K7171 (1994) using an Instron universal testing machine (manufactured by Instron) to measure elastic modulus and bending strain (ductility). The number of measurements was 6, and the average value was determined (Table 2 and Table 3). In a case where the resin plate was not broken in the resin bending test, the apparatus was stopped when the bending deflection exceeded 12 mm, and the strain value at that time was considered as the fracture strain. In Examples 1 to 12, the bending fracture strain was 4.5% or more. On the other hand, in Comparative Examples 1 and 2 in which the constituent [B] was not added, the bending fracture strain did not reach 4.5%.

the bending fracture strain of the cured resin products of Comparative Examples 1 and 2 in which the constituent [B] was not added was less than 4.5%, which was shortfall. It was also shown that the higher the addition amount of the constituent [B], the lower the elastic modulus and the higher the bending fracture strain tended to be, and the higher the addition amount of solid epoxy resin in the constituent [A], the higher the elastic modulus and the lower the bending fracture strain tended to be. It was also shown that the lower the addition amount of the constituent [D], the lower the bending fracture strain tended to be.

In both Examples 13 and 14, the bending fracture strain was 4.5% or more. On the other hand, in Comparative Examples 6 and 8 in which the number average molecular weight of the constituent [G] was more than 800 g/mol, the bending fracture strain did not reach 4.5%. It was also shown that the higher the number average molecular weight of the constituent [G], the lower the bending fracture strain tended to be. Further, the bending fracture strain of the cured resin of Comparative Examples 11 to 13 in which the number average molecular weight of the constituent [D] (constituent [D']) was more than 28,000 g/mol was less than 4.5%, which was shortfall. It was shown that the lower the addition amount of the constituent [D], the lower the bending fracture strain tended to be. On the other hand, the elastic modulus of the cured resin product of Comparative Example 10 in which the number average molecular weight of the constituent [D] (constituent [D']) was less than 16,000 g/mol exhibited the lowest value among those in Examples and Comparative Examples.

<Evaluation of Light Resistance of Cured Resin Product>

The cured product of the epoxy resin having a thickness of 2 mm obtained in <Production of cured resin plate> described above was cut into a piece of 10±0.1 mm-wide and 60±1 mm-long to obtain a test piece. While a surface of the resulting test piece was half covered with aluminum foil, a metaling weather meter (M6T, manufactured by Suga Test Instruments Co., Ltd.) with wavelength and illuminance set to 300 to 400 nm and 1.55 $kW/m^2$, respectively, was used to irradiate UV light with integrated intensity of 1,000 $KJ/m^2$, known as an estimated amount of UV radiation for a month in Japan (summer), because the cured product of the epoxy resin composition of the present invention is possibly exposed to sunlight outdoors on a yearly basis. After irradiation, the aluminum foil is removed. Then, appearance of an area which was covered with aluminum foil and appearance of an area which was not covered with aluminum foil are observed with the naked eye so that it is possible to check the presence or absence of discoloration of the cured product of the epoxy resin before or after UV irradiation. The color difference of the cured product of the epoxy resin composition before and after irradiation was measured using a multiple light source spectrophotometer (MSC-P, manufactured by Suga Test Instruments Co., Ltd.). The epoxy resin composition was set in the multiple light source spectrophotometer, and the reflectance was measured under the following measurement conditions: wavelength, in a range from 380 to 780 nm; reflectance mode; C light source; field of view, 2°; incidence, 8°. Furthermore, the colorimetric values (L*1, a*1, b*1) before UV irradiation in the L*a*b* color system were obtained using a program attached to the device. Next, the colorimetric values (L*2, a*2, b*2) after UV irradiation were determined in the same manner. Furthermore, the color difference $\Delta E^*_{ab}$ of the cured product of the epoxy resin composition before and after UV irradiation was determined by $\Delta E^*_{ab}=[(L^*_1-L^*_2)^2+(a^*_1-a^*_2)^2+(b^*_1-b^*_2)^2]^{1/2}$. When the obtained $\Delta E^*_{ab}$ was 4 or less, the light resistance was evaluated as "good", and when $\Delta E^*_{ab}$ was more than 4, the light resistance was evaluated as "poor" (Table 2 and Table 3).

Comparative Example 5 including 88.5 parts by mass of an aromatic epoxy resin had poor light resistance. Accordingly, those including aromatic epoxy resins exhibited tendency to have poor light resistance.

Comparative Example 14 including 40 parts by mass of an aromatic epoxy resin had poor light resistance. Accordingly, those including aromatic epoxy resins exhibit tendency to have poor light resistance.

TABLE 1

| | | Product | | Example | | | | | | | |
|---|---|---|---|---|---|---|---|---|---|---|---|
| | Constituent | name | Unit | 1 | 2 | 3 | 4 | 5 | 6 | 7 | 8 |
| Composition before heating | Epoxy resin component | EPALLOY5000<br>EHPE3150<br>jER828 | Parts by mass | 93.3 | 95.1 | 84.5 | 53.0 | 58.9 | 83.0 | 48.9 | 98.0 |
| | Amine component | PACM | | 6.7 | 4.9 | 15.5 | 2.0 | 6.1 | 2.0 | 6.1 | 2.0 |
| Composition after heating | Constituent [A] Aromatic epoxy resin | EPALLOY5000<br>EHPE3150<br>jER828 | Parts by mass | 67 | 76 | 24 | 45 | 35 | 75 | 25 | 90 |
| | Constituent [B] | — | | 33 | 24 | 76 | 10 | 30 | 10 | 30 | 10 |
| | Epoxy/amine preliminary reaction product | — | | | | | | | | | |

| | | Product | | Example | | | | Comparative Example | | |
|---|---|---|---|---|---|---|---|---|---|---|
| | Constituent | name | Unit | 9 | 10 | 11 | 12 | 3 | 4 | 5 |
| Composition before heating | Epoxy resin component | EPALLOY5000 | Parts by mass | 23.0 | 53.0 | 53.0 | 53.0 | 66.1 | 45 | |
| | | EHPE3150 | | | | | | | 45 | |
| | | jER828 | | | | | | | | 88.5 |
| | Amine component | PACM | | 2.0 | 2.0 | 2.0 | 2.0 | 33.9 | 10 | 11.5 |

TABLE 1-continued

| | | | | | | | | | | |
|---|---|---|---|---|---|---|---|---|---|---|
| Composition after heating | Constituent [A] | EPALLOY5000 | Parts by mass | 15 | 67 | 67 | 67 | | | |
| | | EHPE3150 | | | | | | | | |
| | Aromatic epoxy resin | jER828 | | | | | | | | 50 |
| | Constituent [B] | — | | 10 | 33 | 33 | 33 | | | |
| | Epoxy/amine preliminary reaction product | — | | | | | | 100 | 100 | 50 |

TABLE 2

| | Component | Product name | Number average molecular weight | Unit | Example 1 | 2 | 3 | 4 | 5 | 6 | 7 | 8 |
|---|---|---|---|---|---|---|---|---|---|---|---|---|
| Composition | Aromatic epoxy resin | jER828 | 350 | Parts by mass | | | | | | | | |
| | Epoxy/amine preliminary reaction product | — | — | | | | | | | | | |
| | Constituent [A] | EPALLOY5000 | 410 | | 67 | 76 | 24 | 45 | 35 | 75 | 25 | 90 |
| | | EHPE3150 | 1100 | | | | | 45 | 35 | 15 | 45 | |
| | Constituent [B] | — | — | | 33 | 24 | 76 | 10 | 30 | 10 | 30 | 10 |
| | Constituent [C] | DICY7T | — | | 3.6 | 4.1 | 1.1 | 5.4 | 4.2 | 5.1 | 4.3 | 4.9 |
| | Constituent [D] | BX-L | 18000 | | 15 | 20 | 6 | 15 | 15 | 20 | 6 | 20 |
| | | KS-10 | 17000 | | | | | | | | | |
| | | KS-1 | 27000 | | | | | | | | | |
| | | BL-10 | 15000 | | | | | | | | | |
| | | BL-5Z | 32000 | | | | | | | | | |
| | | BM-5 | 56000 | | | | | | | | | |
| | | Vinylec K | 52000 | | | | | | | | | |
| | Constituent [E] | Omicure24 | — | | 2 | 2 | 2 | 2 | 2 | 2 | 2 | 2 |
| | Constituent [F] | RY200S | — | | 6.1 | 6.1 | 6.1 | 6.1 | 6.1 | 6.1 | 6.1 | 6.1 |
| | | R-960 | — | | 30 | 30 | 30 | 30 | 30 | 30 | 30 | 30 |
| | | Active hydrogen equivalent weight/epoxy equivalent weight | | | 1.0 | 1.0 | 1.0 | 1.0 | 1.0 | 1.0 | 1.0 | 1.0 |
| Resin properties | | Number average molecular weight of mixture of constituents [A] and [B] | | g/mol | 516 | 479 | 756 | 624 | 683 | 485 | 763 | 436 |
| | | Exothermic reaction peak temperature | | °C | 128 | 128 | 127 | 129 | 128 | 128 | 129 | 129 |
| | | Viscosity measurement while raising temperature | 30 °C | kPa · s | 64.63 | 41.21 | 70.00 | 70.29 | 72.31 | 45.44 | 75.31 | 38.21 |
| | | | 80 °C | | 0.21 | 0.20 | 0.28 | 0.19 | 0.18 | 0.21 | 0.28 | 0.15 |
| | | | 100 °C | | 0.12 | 0.13 | 0.14 | 0.12 | 0.13 | 0.13 | 0.14 | <0.10 |
| | | Film formation | | | Possible | Possible | Possible | Possible | Possible | Possible | Possible | Possible |
| | | Tackiness properties | | | Good | Good | Good | Good | Good | Good | Good | Poor |
| | | Adhesiveness | | | Good | Good | Good | Good | Good | Good | Good | Good |
| | | Resin flow | | | A | A | A | A | A | A | A | B |
| | | Bending test | Bending fracture strain | % | 14.2 | 14.2 | 14.2 | 5.1 | 7.0 | 5.4 | 5.5 | 6.9 |
| | | | Elastic modulus | GPa | 3.7 | 3.8 | 3.5 | 4.1 | 3.9 | 3.6 | 4.0 | 3.9 |
| | | Light resistance | | | Good | Good | Good | Good | Good | Good | Good | Good |

| | Component | Product name | Number average molecular weight | Unit | Example 9 | 10 | 11 | 12 | Comparative Example 1 | 2 | 3 | 4 | 5 |
|---|---|---|---|---|---|---|---|---|---|---|---|---|---|
| Composition | Aromatic epoxy resin | jER828 | 350 | Parts by mass | | | | | | | | | 50 |

TABLE 2-continued

| | | | | | | | | | | | | | |
|---|---|---|---|---|---|---|---|---|---|---|---|---|---|
| | Epoxy/amine preliminary reaction product | — | — | | | | | | | | 100 | 100 | 50 |
| | Constituent [A] | EPALLOY5000 | 410 | | 15 | 45 | 45 | 45 | 100 | 40 | | | |
| | | EHPE3150 | 1100 | | 75 | 45 | 45 | 45 | | 60 | | | |
| | Constituent [B] | — | — | | 10 | 10 | 10 | 10 | | | | | |
| | Constituent [C] | DICY7T | — | | 5.8 | 5.4 | 5.4 | 5.4 | 5.5 | 6.2 | | | 3.4 |
| | Constituent [D] | BX-L | 18000 | | 1 | | | | 15 | 8 | | | 15 |
| | | KS-10 | 17000 | | | 12 | | | | | | | |
| | | KS-1 | 27000 | | | | 8 | | | | | | |
| | | BL-10 | 15000 | | | | | 40 | | | | | |
| | | BL-5Z | 32000 | | | | | | | | | | |
| | | BM-5 | 56000 | | | | | | | | | | |
| | | Vinylec K | 52000 | | | | | | | | | | |
| | Constituent [E] | Omicure24 | — | | 2 | 2 | 2 | 2 | 2 | 2 | | | 2 |
| | Constituent [F] | RY200S | — | | 6.1 | 6.1 | 6.1 | 6.1 | 6.1 | 6.1 | 6.1 | 6.1 | 6.1 |
| | | R-960 | — | | 30 | 30 | 30 | 30 | 30 | 30 | 30 | 30 | 30 |
| | | Active hydrogen equivalent weight/epoxy equivalent weight | | | 1.0 | 1.0 | 1.0 | 1.0 | 1.0 | 1.0 | | | 1.0 |
| Resin properties | | Number average molecular weight of mixture of constituents [A] and [B] | | g/mol | 874 | 624 | 624 | 624 | 410 | 657 | — | — | 506*[1] |
| | | Exothermic reaction peak temperature | | °C | 128 | 128 | 128 | 128 | 135 | 139 | — | — | 127 |
| | | Viscosity measurement while raising temperature | 30 °C | kPa · s | >200 | 76.65 | 77.30 | 31.12 | 32.56 | 65.50 | — | — | 59.02 |
| | | | 80 °C | | 0.29 | 0.25 | 0.25 | <0.10 | 0.13 | 0.17 | — | — | 0.21 |
| | | | 100 °C | | 0.19 | 0.15 | 0.13 | <0.10 | <0.10 | 0.15 | — | — | 0.13 |
| | | Film formation | | | Possible | Possible | Possible | Possible | Possible | Possible | — | — | Possible |
| | | Tackiness properties | | | Good | Good | Good | Poor | Poor | Good | — | — | Good |
| | | Adhesiveness | | | Poor | Good | Good | Good | Good | Good | — | — | Good |
| | | Resin flow | | | A | A | A | C | B | A | — | — | A |
| | | Bending test | Bending fracture strain | % | 4.5 | 5.0 | 4.6 | 7.4 | 4.4 | 4.2 | — | — | 14.2 |
| | | | Elastic modulus | GPa | 4.4 | 4.1 | 4.2 | 3.6 | 3.9 | 4.4 | — | — | 4.0 |
| | | Light resistance | | | Good | Good | Good | Good | Good | Good | — | — | Poor |

*[1]Number average molecular weight of mixture of aromatic epoxy resin and epoxy/amine preliminary reaction product

TABLE 3

| | Constituent | Product name | Number average molecular weight | Unit | Example 13 | Example 14 | Comparative Example 6 | Comparative Example 7 | Comparative Example 8 | Comparative Example 9 |
|---|---|---|---|---|---|---|---|---|---|---|
| Composition | [G] | jER828 | 350 | Parts | | | | | | |
| | | EPALLOY5000 | 410 | by | 50 | 40 | 20 | 60 | 20 | 60 |
| | | EHPE3150 | 1100 | mass | 50 | 60 | 80 | 40 | 80 | 40 |
| | [C] | DICY7T | — | | 6.1 | 6.2 | 6.4 | 6.0 | 6.4 | 6.1 |
| | [D] | BX-L | 18000 | | 15 | | 8 | 8 | 1 | 20 |
| | | KS-10 | 17000 | | | 15 | | | | |
| | | KS-1 | 27000 | | | | | | | |
| | | BL-10 | 15000 | | | | | | | |
| | | BL-5Z | 32000 | | | | | | | |
| | | BM-5 | 56000 | | | | | | | |
| | | Vinylec K | 52000 | | | | | | | |
| | [E] | Omicure24 | — | | 2 | 2 | 2 | 2 | 2 | 2 |
| | [F] | RY200S | — | | 6.1 | 6.1 | 6.1 | 6.1 | 6.1 | 6.1 |
| | | R-960 | — | | 30 | 30 | 30 | 30 | 30 | 30 |
| | Active hydrogen equivalent weight/epoxy equivalent weight | | | | 1.0 | 1.0 | 1.0 | 1.0 | 1.0 | 1.0 |
| Resin properties | Number average molecular weight of constituent [G] | | | g/mol | 597 | 657 | 823 | 547 | 823 | 547 |
| | Exothermic reaction peak temperature | | | °C | 140 | 139 | 136 | 141 | 136 | 143 |
| | Viscosity measurement while raising temperature | | 30 °C | kPa · s | 43.37 | 79.54 | >200 | 12.2 | >200 | 43.42 |
| | | | 80 °C | | 0.27 | 0.22 | 0.67 | 0.21 | 0.23 | 1.55 |
| | | | 100 °C | | 0.25 | 0.11 | 0.55 | 0.20 | 0.21 | 1.32 |

TABLE 3-continued

| | | | | | | | | |
|---|---|---|---|---|---|---|---|---|
| | Film formation | | Possible | Possible | Impossible | Possible | Possible | Impossible |
| | Tackiness properties | | Good | Good | — | Poor | Good | — |
| | Sticking property | | Good | Good | — | Good | Poor | — |
| | Resin flow | | A | A | A | A | A | A |
| Bending test | Bending fracture strain | % | 5.0 | 4.8 | 3.1 | 5.3 | 1.1 | 6.3 |
| | Elastic modulus | GPa | 3.9 | 4.2 | 4.9 | 3.8 | 5.0 | 3.6 |
| | Light resistance | | Good | Good | Good | Good | Good | Good |

| | Constituent | Product name | Number average molecular weight | Unit | Comparative Example 10 | 11 | 12 | 13 | 14 |
|---|---|---|---|---|---|---|---|---|---|
| Composition | [G] | jER828 | 350 | Parts by mass | | | | | 40 |
| | | EPALLOY5000 | 410 | | 40 | 40 | 40 | 40 | |
| | | EHPE3150 | 1100 | | 60 | 60 | 60 | 60 | 60 |
| | [C] | DICY7T | — | | 6.2 | 6.2 | 6.2 | 6.2 | 6.2 |
| | [D] | BX-L | 18000 | | | | | | 8 |
| | | KS-10 | 17000 | | | | | | |
| | | KS-1 | 27000 | | | | | | |
| | | BL-10 | 15000 | | 30 | | | | |
| | | BL-5Z | 32000 | | | 4 | | | |
| | | BM-5 | 56000 | | | | 3 | | |
| | | Vinylec K | 52000 | | | | | 3 | |
| | [E] | Omicure24 | — | | 2 | 2 | 2 | 2 | 2 |
| | [F] | RY200S | — | | 6.1 | 6.1 | 6.1 | 6.1 | 6.1 |
| | | R-960 | — | | 30 | 30 | 30 | 30 | 30 |
| | Active hydrogen equivalent weight/epoxy equivalent weight | | | | 1.0 | 1.0 | 1.0 | 1.0 | 1.0 |
| Resin properties | Number average molecular weight of constituent [G] | | | g/mol | 657 | 657 | 657 | 657 | 592 |
| | Exothermic reaction peak temperature | | | °C | 139 | 138 | 138 | 139 | 137 |
| | Viscosity measurement while raising temperature | | 30 °C | kPa · s | 27.33 | 71.64 | 78.22 | 77.30 | 71.13 |
| | | | 80 °C | | 0.09 | 0.23 | 0.26 | 0.27 | 0.15 |
| | | | 100 °C | | <0.10 | 0.21 | 0.22 | 0.24 | 0.14 |
| | Film formation | | | | Possible | Possible | Possible | Possible | Possible |
| | Tackiness properties | | | | Poor | Good | Good | Good | Good |
| | Sticking property | | | | Good | Good | Good | Good | Good |
| | Resin flow | | | | B | A | A | A | A |
| | Bending test | Bending fracture strain | | % | 5.3 | 3.0 | 2.5 | 2.6 | 5.0 |
| | | Elastic modulus | | GPa | 3.2 | 4.5 | 4.5 | 4.5 | 4.7 |
| | Light resistance | | | | Good | Good | Good | Good | Poor |

The invention claimed is:

1. An epoxy resin composition comprising the following constituents [A], [B], [C], and [D], wherein 95 mass % or more of the total mass of the constituent [B] is a non-aromatic epoxy resin represented by formula (I) where n is 1:

[A]: a non-aromatic epoxy resin other than the constituent [B];

[B]: a non-aromatic epoxy resin represented by formula (I):

[Chem. 1]

(I)

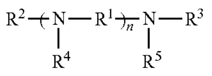

where $R^1$ represents a divalent group which is any one of a non-aromatic hydrocarbon group and a non-aromatic hydrocarbon group connected via an ether group or an amino group (—NR—; where R is a non-aromatic hydrocarbon group) (hereinafter, a "group which is a non-aromatic hydrocarbon group or a non-aromatic hydrocarbon group connected via an ether group or an amino group (—NR—; where R is a non-aromatic hydrocarbon group)" is collectively referred to as a "non-aromatic organic group");

$R^2$ and $R^3$ each represents a non-aromatic organic group in which hydrogen atoms of said non-aromatic hydrocarbon group are substituted with at least one epoxy group and at least one hydroxyl group;

$R^4$ and $R^5$ each represents a non-aromatic organic group in which hydrogen atoms of said non-aromatic hydrocarbon group are substituted with at least one epoxy group and at least one hydroxyl group, a non-aromatic hydrocarbon group forming a part of a nitrogen-containing heterocycle, or a hydrogen atom, wherein in formula (I), n is an integer of 1 to 5; and $R^1$, $R^2$, $R^3$, $R^4$, and $R^5$ each represents a hydrogen atom, a linear, branched, or cyclic structure;

[C]: a curing agent; and

[D]: a non-aromatic thermoplastic resin.

2. The epoxy resin composition according to claim 1, wherein the number average molecular weight of an epoxy resin mixture of the constituents [A] and [B] is 450 to 800 g/mol.

3. The epoxy resin composition according to claim 1, wherein the number average molecular weight of the constituent [D] is 16,000 to 28,000 g/mol.

4. The epoxy resin composition according to claim 1, comprising 1 to 20 parts by mass of the constituent [D] with respect to 100 parts by mass of the total of the constituents [A] and [B].

5. The epoxy resin composition according to claim 1, wherein the constituent [C] is a non-aromatic curing agent.

6. The epoxy resin composition according to claim 5, wherein the constituent [C] is dicyandiamide.

7. The epoxy resin composition according to claim 1, further comprising a curing accelerator (constituent [E]).

8. The epoxy resin composition according to claim 1, further comprising inorganic particles (constituent [F]).

9. The epoxy resin composition according to claim 8, wherein the constituent [F] is a thixotropic agent, and the epoxy resin composition comprises 1 to 10 parts by mass of the thixotropic agent with respect to 100 parts by mass of the total of the constituents [A] and [B].

10. The epoxy resin composition according to claim 1, wherein viscosity measured at a frequency of 0.5 Hz while increasing temperature from 20 °C to 150 °C at 2 °C/min is as follows:

40,000 Pa·s or more and 200,000 Pa·s or less at 30 °C;

300 Pa·s or less at 80 °C;

100 Pa·s or more and 300 Pa·s or less at 100 °C.

11. A prepreg comprising the epoxy resin composition according to claim 1 impregnated into a fibrous material.

12. An epoxy resin composition comprising constituents [G], [C], and [D'], and having the following properties 1 and 2:

[G]: a mixture of epoxy resins including at least one non-aromatic epoxy resin and having a number average molecular weight of 550 to 800 g/mol as a mixture;

[C]: a curing agent;

[D']: a non-aromatic thermoplastic resin having a number average molecular weight of 16,000 to 28,000 g/mol;

Property 1: Bending fracture strain is determined as 4.5% or more for a cured resin plate with a thickness of 2 mm, obtained by defoaming in a vacuum, raising temperature at a temperature ramp rate of 2 °C/min, maintaining the temperature at 180 °C for 120 minutes, and curing;

Property 2: The epoxy resin composition does not include a non-aromatic epoxy resin represented by formula (I):

[Chem. 2]

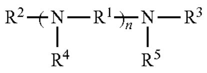

(I)

where $R^1$ represents a divalent non-aromatic organic group;

$R^2$ and $R^3$ each represents a non-aromatic organic group in which hydrogen atoms of said non-aromatic hydrocarbon group are substituted with at least one epoxy group and at least one hydroxyl group;

$R^4$ and $R^5$ each represents a non-aromatic organic group in which hydrogen atoms of said non-aromatic hydrocarbon group are substituted with at least one epoxy group and one hydroxyl group, a non-aromatic hydrocarbon group forming a part of a nitrogen-containing heterocycle, or a hydrogen atom, wherein in formula (I), n represents an integer of 1 to 5; and $R^1$, $R^2$, $R^3$, $R^4$ and $R^5$ each represents a hydrogen atom, or a linear, branched, or cyclic structure.

13. A prepreg comprising the epoxy resin composition according to claim 12 impregnated into a fibrous material.

* * * * *